US011562359B2

(12) United States Patent
Banik et al.

(10) Patent No.: US 11,562,359 B2
(45) Date of Patent: Jan. 24, 2023

(54) SYSTEM AND METHOD FOR PERFORMING FINANCIAL TRANSACTIONS USING A WIRELESS PERSONAL ASSISTANT

(71) Applicant: PAYPAL, INC., San Jose, CA (US)

(72) Inventors: Arnab Banik, San Jose, CA (US); Hemal Doshi, San Jose, CA (US); David Kenneth Fefferman, San Jose, CA (US); Novalina Nursalim, San Francisco, CA (US)

(73) Assignee: PAYPAL, INC., San Jose, CA (US)

( * ) Notice: Subject to any disclaimer, the term of this patent is extended or adjusted under 35 U.S.C. 154(b) by 131 days.

(21) Appl. No.: 16/274,854

(22) Filed: Feb. 13, 2019

(65) Prior Publication Data

US 2019/0251545 A1  Aug. 15, 2019

Related U.S. Application Data

(60) Provisional application No. 62/630,234, filed on Feb. 13, 2018.

(51) Int. Cl.
*G06Q 40/06* (2012.01)
*G06Q 20/40* (2012.01)
(Continued)

(52) U.S. Cl.
CPC ......... *G06Q 20/4012* (2013.01); *G06F 3/167* (2013.01); *G06Q 20/3227* (2013.01);
(Continued)

(58) Field of Classification Search
CPC ........... G06Q 20/3227; G06Q 20/3278; G06Q 20/4014; G06Q 40/00; G06Q 20/4012; G06F 3/167; G10L 15/22; G10L 2015/223
See application file for complete search history.

(56) References Cited

U.S. PATENT DOCUMENTS

2003/0074328 A1 * 4/2003 Schiff ................... G06Q 20/18
705/75
2003/0097596 A1 * 5/2003 Muratov ............... G06F 21/575
726/26
(Continued)

FOREIGN PATENT DOCUMENTS

TW         201244511 A   * 11/2012
WO    WO-2017076477 A1 *  5/2017 ............ G06F 21/35

OTHER PUBLICATIONS

Krista Becker, Mobile Phone: The New Way to Pay?, Feb. 2007, Federal Reserve Bank of Boston, web, 1-11 (Year: 2007).*
(Continued)

*Primary Examiner* — I Jung Liu
(74) *Attorney, Agent, or Firm* — Haynes and Boone, LLP

(57) ABSTRACT

Aspects of the present disclosure involve systems, methods, devices, and the like for performing financial transactions. In one embodiment, a system is introduced that enables a communication between a user and a wireless personal assistant. The communication occurs through the use of a vocal command which is recognized and authenticated by the wireless personal assistant for the request and transfer of a monetary amount between a user and a contact. The communication occurs using a financial institution associated with the user and linked with the wireless personal assistant for the manipulation of funds from the user account.

20 Claims, 10 Drawing Sheets

(51) Int. Cl.
*G06Q 20/32* (2012.01)
*G10L 15/22* (2006.01)
*G06F 3/16* (2006.01)

(52) U.S. Cl.
CPC ..... *G06Q 20/3278* (2013.01); *G06Q 20/4014* (2013.01); *G10L 15/22* (2013.01); *G10L 2015/223* (2013.01)

(56) References Cited

U.S. PATENT DOCUMENTS

| | | | | |
|---|---|---|---|---|
| 2008/0270301 | A1* | 10/2008 | Jones | G06Q 20/425 |
| | | | | 705/41 |
| 2011/0320347 | A1* | 12/2011 | Tumminaro | G06Q 20/322 |
| | | | | 705/39 |
| 2013/0060679 | A1 | 3/2013 | Oskolkov et al. | |
| 2015/0278929 | A1* | 10/2015 | Nuzzi | G06Q 30/0261 |
| | | | | 705/26.9 |
| 2016/0012465 | A1* | 1/2016 | Sharp | G06Q 20/321 |
| | | | | 705/14.17 |
| 2017/0003846 | A1 | 1/2017 | Patel et al. | |
| 2017/0330277 | A1 | 11/2017 | Wishne et al. | |
| 2017/0344994 | A1* | 11/2017 | Wang | G06Q 20/405 |

OTHER PUBLICATIONS

Extended European Search Report dated Oct. 21, 2021, in related European application No. EP 19755122.9, 9 pages.
International Appl. No. PCT/US2019/017905, International Preliminary Report on Patentability dated Aug. 27, 2020, 6 pages.
International Appl. No. PCT/US2019/017905, International Search Report and Written Opinion dated May 7, 2019, 6 pages.

* cited by examiner

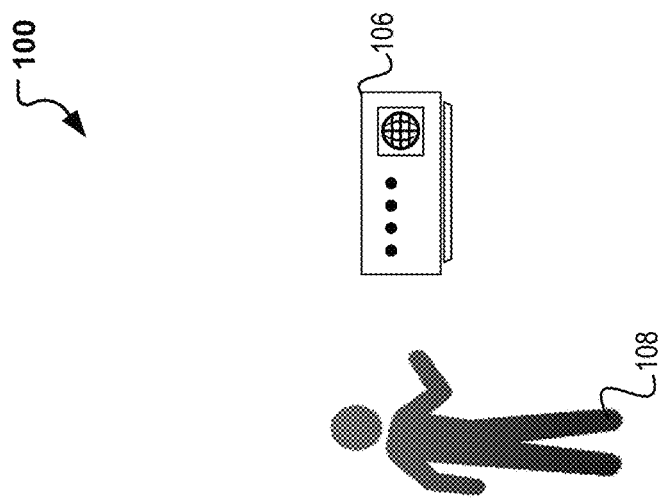
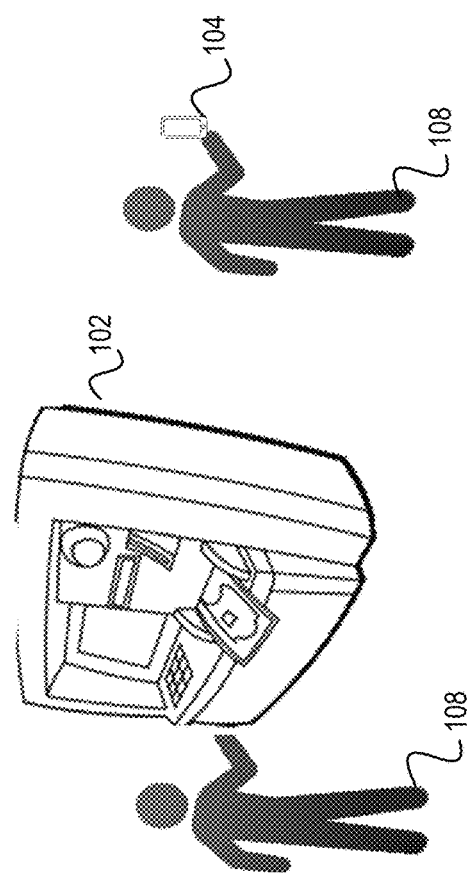

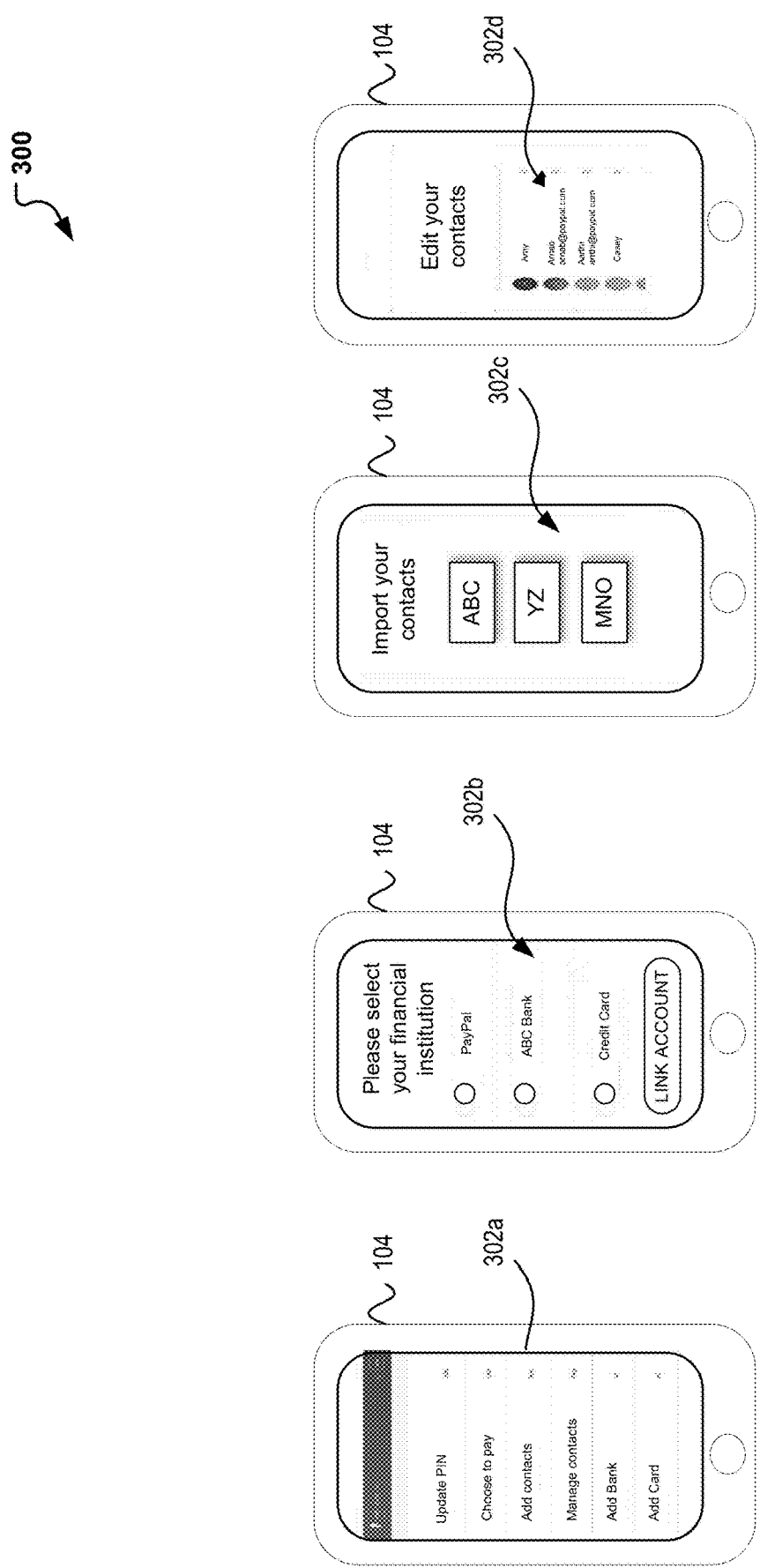

SYSTEM AND METHOD FOR PERFORMING FINANCIAL TRANSACTIONS USING A WIRELESS PERSONAL ASSISTANT

RELATED MATTERS

This application claims priority benefit from U.S. Provisional Patent Application No. 62/630,234, titled "System and Method for Performing Financial Transactions Using a Wireless Personal Assistant" filed Feb. 13, 2018.

TECHNICAL FIELD

The present disclosure generally relates to wireless personal assistant systems, and more specifically, to performing financial transactions using a wireless personal assistant system.

BACKGROUND

Rapid advancements in technology and communications have led to the ubiquitous use of wireless electronics. As such, today's society has grown to become heavily device reliant. This reliance has led to the use of electronics to make monetary transactions for goods and services. For example, a smartphone may now be used to complete a transaction or transfer a monetary amount with a financial institution. However, such monetary transfer often requires the user to be fully engaged and input information to the smartphone, limiting a user's time and ability to multitask. Therefore, it would be beneficial if a system where created that provides a user with the ability to transfer funds and make payments without the need for user input.

BRIEF DESCRIPTION OF THE FIGURES

FIGS. 1A-1C illustrates block diagrams of a first user interaction with one or more devices for performing a transaction.

FIG. 3A-3D illustrates other communications with a user device for account setup and use with the wireless personal assistant system.

Figure 2B:
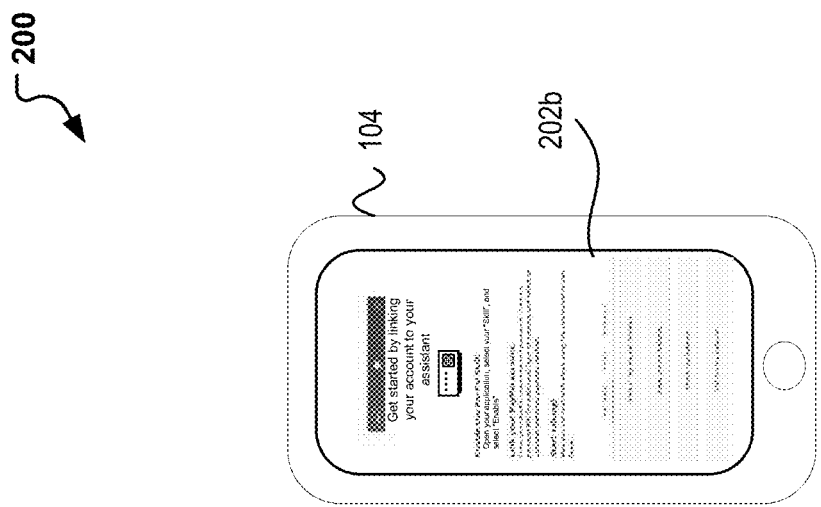
FIGS. 2A-2B illustrates a communication with a user device for linking a wireless personal assistant system.

Embodiments of the present disclosure and their advantages are best understood by referring to the detailed description that follows. It should be appreciated that like reference numerals are used to identify like elements illustrated in one or more of the figures, whereas showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Aspects of the present disclosure involve systems, methods, devices, and the like for performing financial transactions. In one embodiment, a system is introduced that enables a communication between a user and a wireless personal assistant. The communication occurs through the use of a vocal command which is recognized and authenticated by the wireless personal assistant for the request and transfer of a monetary amount between a user and a contact. The communication occurs using a financial institution associated with the user and linked with the wireless personal assistant for the manipulation of funds from the user account.

Rapid advances in communications have made portable electronic devices, such as smartphones and tablets, part of everyday life. Among other things, these electronic devices can be used to browse the web and stream video, and purchase goods and services. In some instances, one or more electronic devices can be used to make a transfer of a monetary amount between accounts and/or users. However, in some instances the smartphone or device may not be readily available and/or the user is tied up and unable to input the information necessary to make the transaction.

Conventionally, the transfer of cash has occurred at an automated teller machine (ATM) using a physical bank card. Most recently, the capability is supported using an application associated with a bank institution and/or a third party service provider using a user device or computer. Transacting in this manner, however, may be cumbersome, time consuming, and limiting to the user. Additionally, this manner of transacting requires either travel to the automated teller machine or the use and presence of a mobile device.

To illustrate this, FIGS. 1A-1C, include block diagrams of a user interaction with one or more devices for performing a transaction. In FIG. 1A, a user 108 is interacting with an automated teller machine (ATM) 102 for performing one or more transactions. The ATM 102 can be used to access funds and perform transactions using an institutional card and/or in conjunction with a personal device such as a smartphone, tablet, laptop, pc, or the like. However, as illustrated in FIG. 1A, transacting with an ATM 102 requires a user 108 to physically travel to the location of the ATM 102 which can be time consuming and inconvenient. Alternatively, the user 108 may be interested in transacting with another user who may not share a joint account or even an account at the financial institution associated with the user 108 and/or the ATM 102, limited the transaction type available to the user 108.

FIG. 1B illustrates user 108 interacting with a user device 104 for performing one or more transactions. The user device 104 may be a tablet, iPad, cell phone or the like. For exemplary purposes, user device 104 can be a smart phone. The smart phone may be equipped with various applications for performing similar tasks as indicated with personal device 102. For example, the user device 104 may be used for web browsing, video streaming, bill payments, and online purchases. Additionally, the user device 104 be equipped with applications that enable the user to make purchases and transfers using a payment provider application and/or a digital wallet. Further, the user device 104 is capable of making phone calls and communicating with one or more other communications devices using a cellular network, Wi-Fi, Bluetooth, BLE, NFC, WLAN, etc. The communication can enable the transmission of information from a user account to a secondary source. For example, the user device 104 can be used to make a purchase for a good or service using an application or digital wallet. Here, although the user device 104 is portable and accessible for purchases, the conventional smart phone is limited by the ability to interact with the user often requiring the need for user input to make a transaction. Therefore, in order to mitigate the inconvenience associated with ATM machines 102 and user devices 104 a method and system is introduced that alleviates such disadvantages.

FIG. 1C illustrates a user 108 interacting with a personal assistant 106 for performing a transaction. In a current embodiment, a system and method is introduced that enables financial transactions without the need for ATM 102 or user device 104 input. In particular, a system is introduced that enables the communication with a wireless personal assistant 106 for transacting, including but not limited to the transfer and request of a monetary amount from an individual.

In one embodiment, a transfer of a monetary amount is performed using a wireless personal assistant 106. For example, a user 108 may communicate a vocal command to the wireless personal assistant 106 to perform a transfer of "$10 to John." The wireless personal assistant 106 may then communicate with a service provider or other financial institution designated by the user 108 to access the user's account and make the transfer. The transfer of the monetary amount and recognition of the user 108 performing the request may come in response to a linking and other authentication setup that can occur on an application of the user device 104. The account setup, wireless personal assistant 106 recognition, and authentication can occur via a wireless communication linking, token exchange, PIN identification, and other process which has been put in place. In some embodiments, once the user authentication has been established, the wireless personal assistant 106 can be used for actions including but not limited to transferring funds, requesting funds, updating contact lists and profiles, and the like. To communicate with the wireless personal assistant, near field communications, cellular, WiFi, Bluetooth and/or other communication network may be used singly or in combination with the wireless personal assistant and/or other smart device.

FIGS. 2-4 provide exemplary embodiments illustrating a communication over a user device 104 enabling the performance of a financial transaction using a wireless personal assistant 106. Note that FIGS. 2-4 are for exemplary purposes only and other methods, flows, and user interfaces may be contemplated. In addition, although the process is illustrated as beginning at the user device 104, the process of beginning the transaction may occur at a desktop, computer, tablet, or other smart device capable of communicating with the wireless personal assistant 106.

Figure 2A:
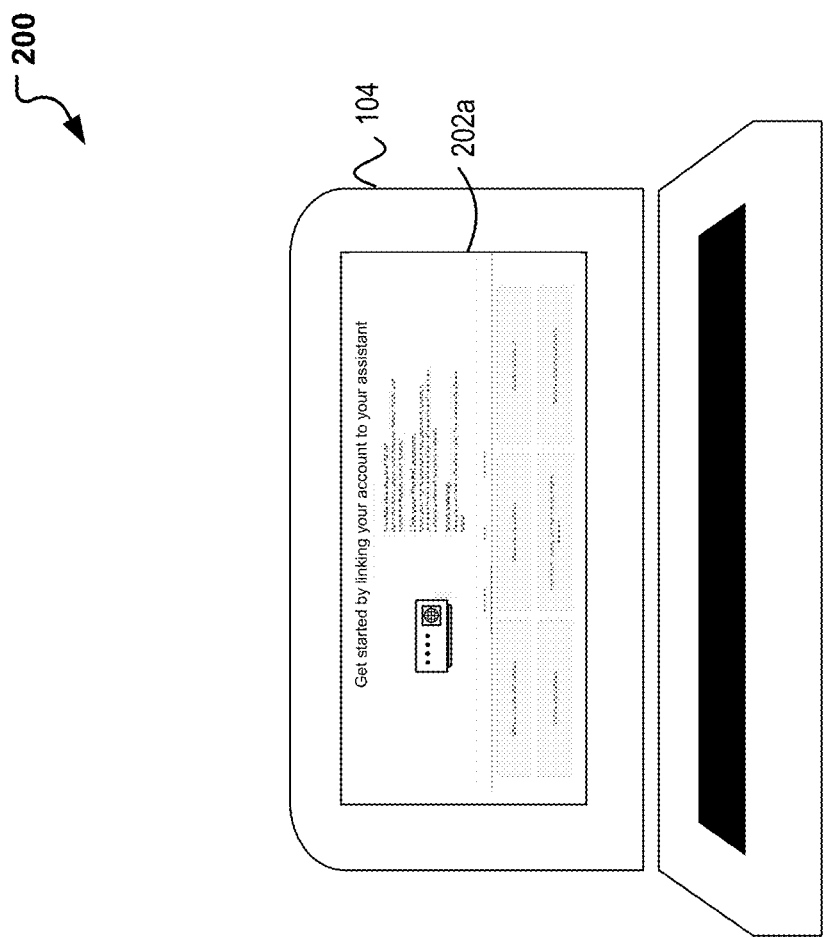

FIGS. 2A-2B illustrate the communication 200 over a user device 104 for the setup of a user account and the linking of the wireless personal assistant with the user device 106 and/or financial institution for use in the financial transactions performed by the wireless personal assistant. For exemplary purposes, a PayPal application will be used for illustrating various user interfaces 202 that may appear on a user device 104 as a user 108 is in the process of setting up and establishing communication with the wireless personal assistant 106.

In some embodiments, the communication 200 is initiated by a user 108 when opening the PayPal application and is presented with a homepage that enables you to link to a wireless personal assistant 106. In some instances, the user may select the option presented with a prompt indicating the opportunity to link to an external device such as the wireless personal assistant 106. In some embodiments, upon responding, the user may be presented with a linking UI 202a on a user device 104, which provides the option to link your financial account with the wireless personal assistant 106. In other embodiments, the user may be prompted to visit a specific website associated with the wireless personal assistant for linking the account.

As illustrated on the linking UI 202a, exemplary financial transactions possible using the wireless personal assistant 106 are illustrated. The linking illustrated at FIG. 2A is presented on a laptop computer or device 104. Additionally or alternatively, the linking may occur on another device 104 such as for example a smart phone. Illustrated at FIG. 2B is another linking UI 202b, that may be presented on a smart phone. The linking UI 202a,b can include a selection of one or more commands which may be recognized when requesting, transferring, or vocalizing a request for a balance from the personal assistant 106. For example, a balance on an account may be obtained. Such balance may be retrieved using numerous vocal commands including, but not limited to prompting the wireless personal assistant, "What is my balance", "Show me my balance," "Check my balance", etc. Similarly, vocal commands may be used to send money and/or request money using the now linked account. For example, such vocal commands can include, "Transfer $ to X", "Request $ from Y," etc. Note that the commands and options illustrated in FIGS. 2A-2B are for exemplary purposes and other options and commands are possible. Additionally, note that the device used for linking the financial account with the wireless personal assistant is not limited to the use of a user device 104, but can include a laptop, desktop, iPad, smartphone, etc.

Once the user 108 has arrived at the linking UI 202a,b, the user 108 may be presented with a series of options including the ability to modify and personalize system settings for use in the communication with the wireless personal assistant 106. For exemplary purposes, FIGS. 3A-3D are presented to illustrate possible UIs 302a-d.

FIG. 3A begins with a settings UI 302a enable to allow the user 108 to update, import, and manage the account settings associated with the wireless personal assistant 106. For example, from settings UI 302a, the user 108 is able to select the option to be routed to site or UI for the update of a PIN for use in transacting and authenticating. As another example, from the settings UI 302a, the user can select the option to be routed for choosing the one or more financial instruments to use for transacting using the wireless personal assistant 106. Other examples include the ability to update and manage contacts, financial institutions, and cards.

As illustrated in FIG. 3B, the option to manage the financial institution (FI) option has been selected. Therefore, FI UI 302b is illustrated providing various payment methods available on the user's digital wallet for payment. From these payment methods, FI UI 302b enables the selection of a preferred method of payment. That is to say, the user 108 can select which account to use as the primary source of income for making the financial transactions using the wireless personal assistant 106. The user 108 may therefore select a payment provider account, one or more bank accounts, credit cards, lines of credit, a gift card, award points or credit, merchant card, etc.

Illustrated in FIG. 3C, is contacts UI 302c for managing user contacts for transacting with the wireless personal assistant. This contacts UI 302c can appear in response to the selection from the settings UI 302a to manage contacts. As illustrated in contacts UI 302, the ability to import contacts is presented, where a user 108 can select one or more social media sites from which to import contact information. For example, the contacts may be imported from your email, word document, Facebook, LinkedIn, Google, Outlook, Microsoft, Yahoo, School directory, list serve, phone contacts, etc. Additionally or alternatively, the contact information can be retrieved from the contacts list located in the local and/or remote user device 104 or application. Still further, at FIG. 3D, add contacts UI 302D presents the ability for a user to add and/or remove contacts that will be available for transacting with using the wireless personal assistant 106.

Note that FIGS. 3A-3D illustrate exemplary UIs 302a-d available for managing user settings in conjunction with the use of the wireless personal assistant 106. However, the settings, setup, and options presented are no limiting and other settings and methods may be contemplated.

Figure 4B:
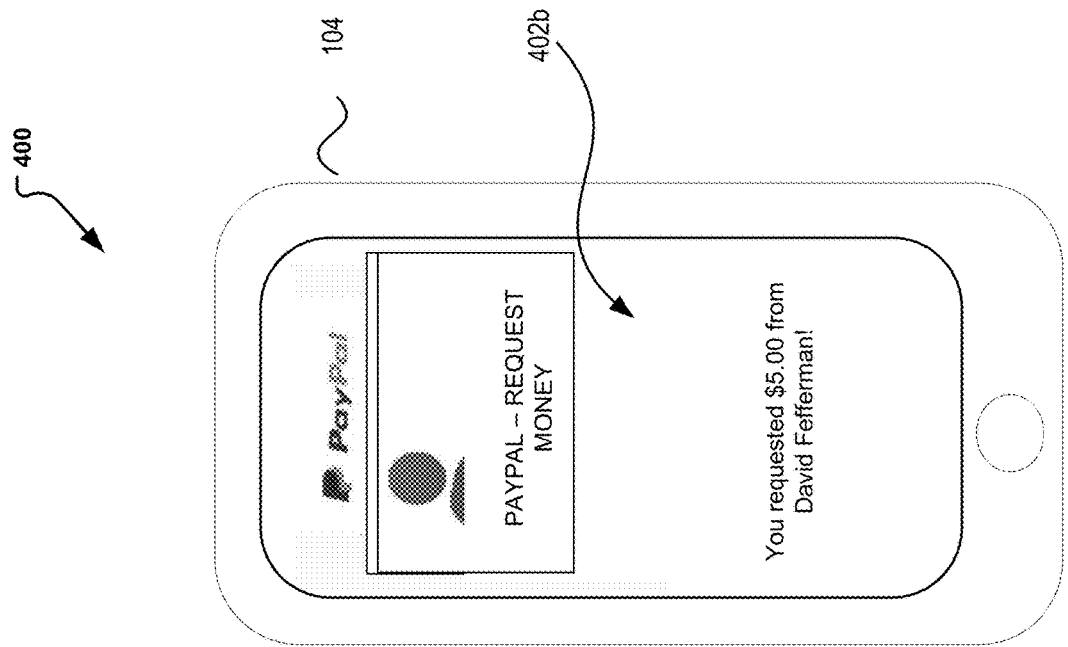
FIG. 4A-4B illustrates yet other communications with a user device demonstrating a completion of financial transaction using the wireless personal assistant system.
Figure 4A:
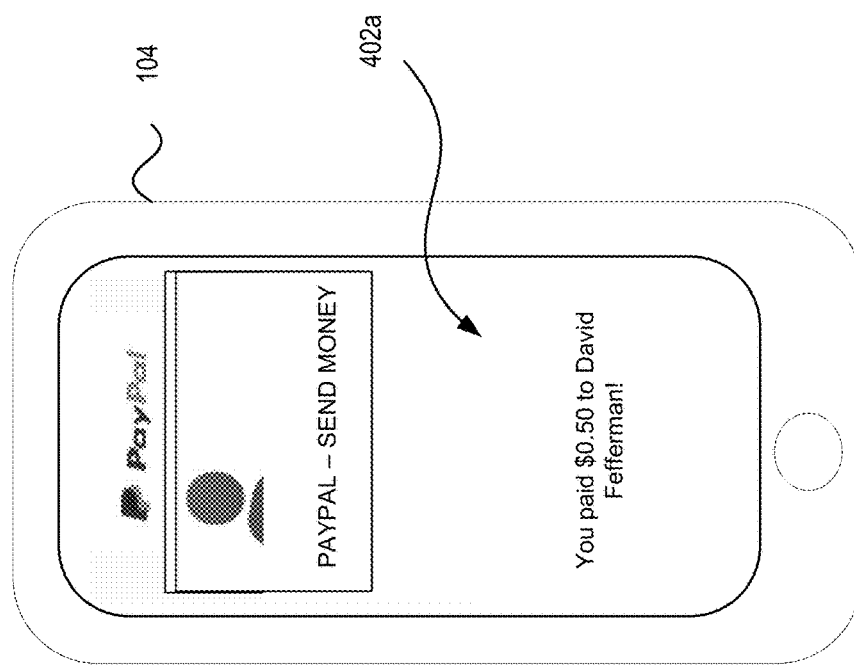

Once the user's desired settings are in place, a user may perform financial transactions using the wireless personal assistant 106. The user 108, may therefore provide a vocal request to the wireless personal assistant 106 for performing a financial transaction without the need for a user input. As an example, FIGS. 4A-4B are presented illustrating a confirmation message that may appear on a screen of a wireless digital assistant 106 and/or user device 104. In particular, FIG. 4A presents a confirmation message that may be received via sent UI 402a where an image of the recipient is presented along with the desired financial instrument used and monetary amount of the transaction. FIG. 4B presents a confirmation message that may be received at user device and/or wireless personal assistant 106 via receive UI 402b. The receive UI 402b can also include an image of the individual from whom the monetary amount request will be made, the amount, and information on the service provider used (e.g., PayPal) or other financial instrument. Note that additional information may be included and/or removed including but not limited to account number, balance, etc. Additionally, note that the request and/or payment may not be limited to one recipient and instead multiple recipients may be used in the transaction. For example, funding may be requested from numerous users who may have share a meal. As another example, a payment may be made to multiple users to whom a monetary amount is owed. Therefore, the vocal command and monetary transaction may be in relation to a money request or transfer with regards to a bill split, donation, gift, contribution, bill pay, or the like.

Figure 5:
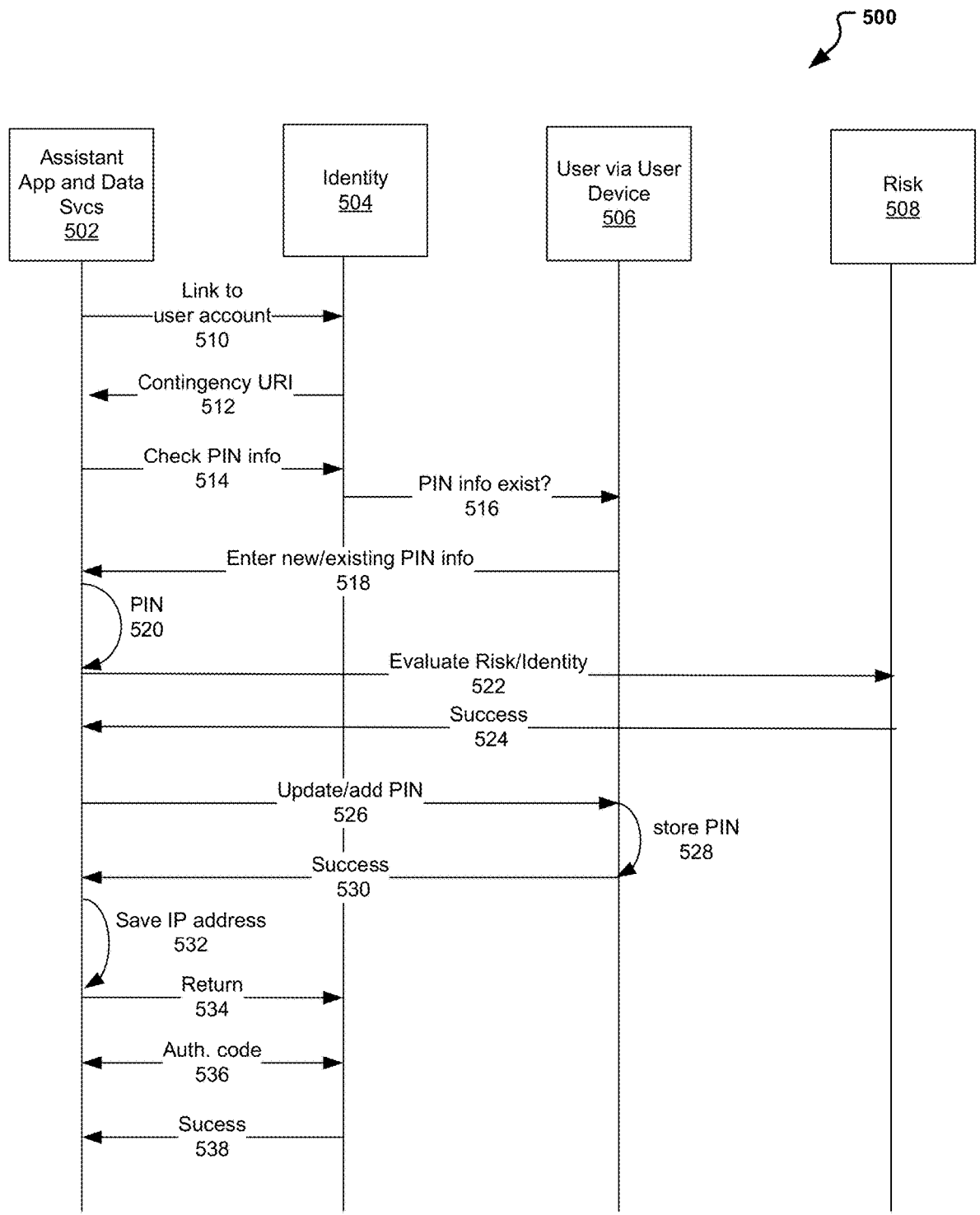
FIG. 5 illustrates a timing diagram of communication between the wireless personal assistant system and a service provider for user onboarding.

Turning next to FIG. 5, a timing diagram 500 is presented which illustrates the communication between the wireless personal assistant system 106 and a service provider for user onboarding. The timing diagram 500 is design to illustrate the onboarding process that may occur between the wireless personal assistant and a service provider or other financial application for a user 108 that currently has an existing PIN, wants to update the PIN, and/or needs to add a PIN. As illustrate in FIG. 5, in timing diagram 500, communication occurs between the assistant application and services 502 and at least an identity entity 504, a user 108 via a user device 104, and a Risk entity 508.

Timing diagram 500 begins with a communication between the assistant application and data services 502 and the identity entity 504. The communication can include the linking that can occur between an application on the wireless personal assistant and generally the user 108 through a user device 104 and/or the user account (service provider). In some instances, the linking can occur through use of a uniform resource identifier (URI) 512 that can use used to enable the interaction between the resources (e.g., wireless personal assistant 106) over a network. Further to the exchange of the URI, a user account information can be considered to determine if a personal identification number (PIN) 514 is available for communication, transmitted from the wireless personal assistant 106, for verification by identity 504. The PIN may be transmitted to identity 504 and to the user/user device 104, where a determination 516 can be made regarding the existence of such PIN in the system. In other words, the system can check to see if a PIN has already been entered or if a new PIN is necessary 518. The PIN 520 (which may be entered or vocalized) may then received and evaluated for risk and identity/authentication 524. If the PIN matches an existing PIN then a risk entity 508 which can be associated with the payment provider, can respond with a success 524. If however, the PIN received is not found and corresponds to a new PIN being added, then the system will store 528 as new PIN. Alternatively, if the PIN received is an updated PIN, then the system will similarly store 528 as the new PIN. Then, in response to the storage of the new PIN, the system, via the user device 506 may respond with a success prompt 530 and may subsequently prompt via the assistant application, the saving of the IP address 532 associated with the user device 506. Once IP prompt is addresses, the notification may be sent back to identity 534, authentication may be completed 536 (via the transmission of an authentication code), and onboarding 538 finalized. Thus, FIG. 5 generally presents the onboarding of the wireless personal assistant 106 to enable the send/request of a monetary account. During onboarding, the user 108 will link to a financial institution (e.g., PayPal account), obtain consent, and establish a PIN for use. Therefore, if a user 108 wants to send funds to a contact, the user will provide the PIN via a spoken request to the wireless personal assistant 106. The PIN may be reused for future integrations and other additional transactions which can occur using the wireless personal assistant 106. Note that timing diagram includes generalized steps that may be used for onboarding however, more or less steps, entities, etc. may be included.

Figure 6:
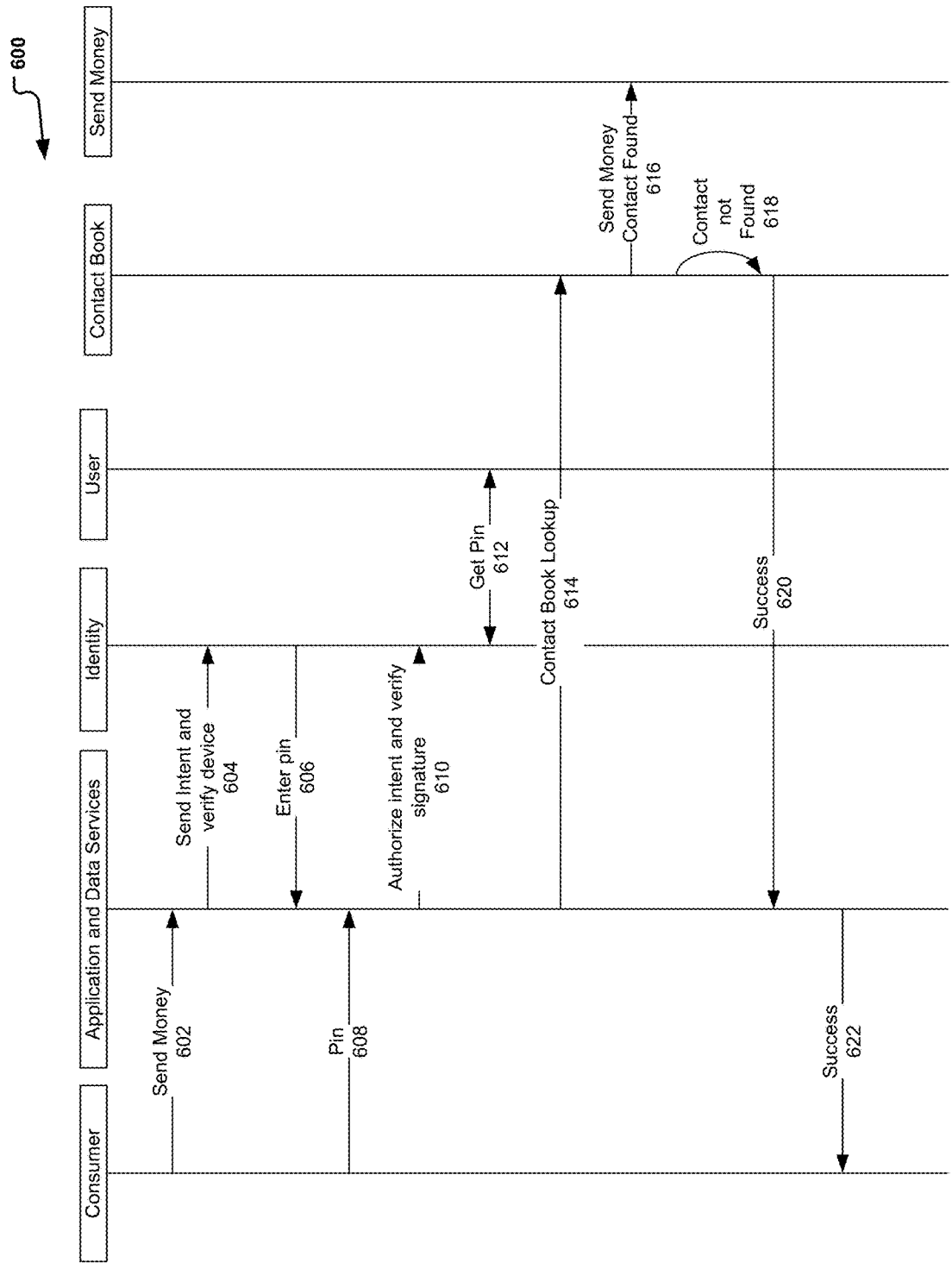
FIG. 6 illustrates a timing diagram of communication between the wireless personal assistant system and a service provider for performing a monetary transfer using a valid personal identification number.
Figure 7:
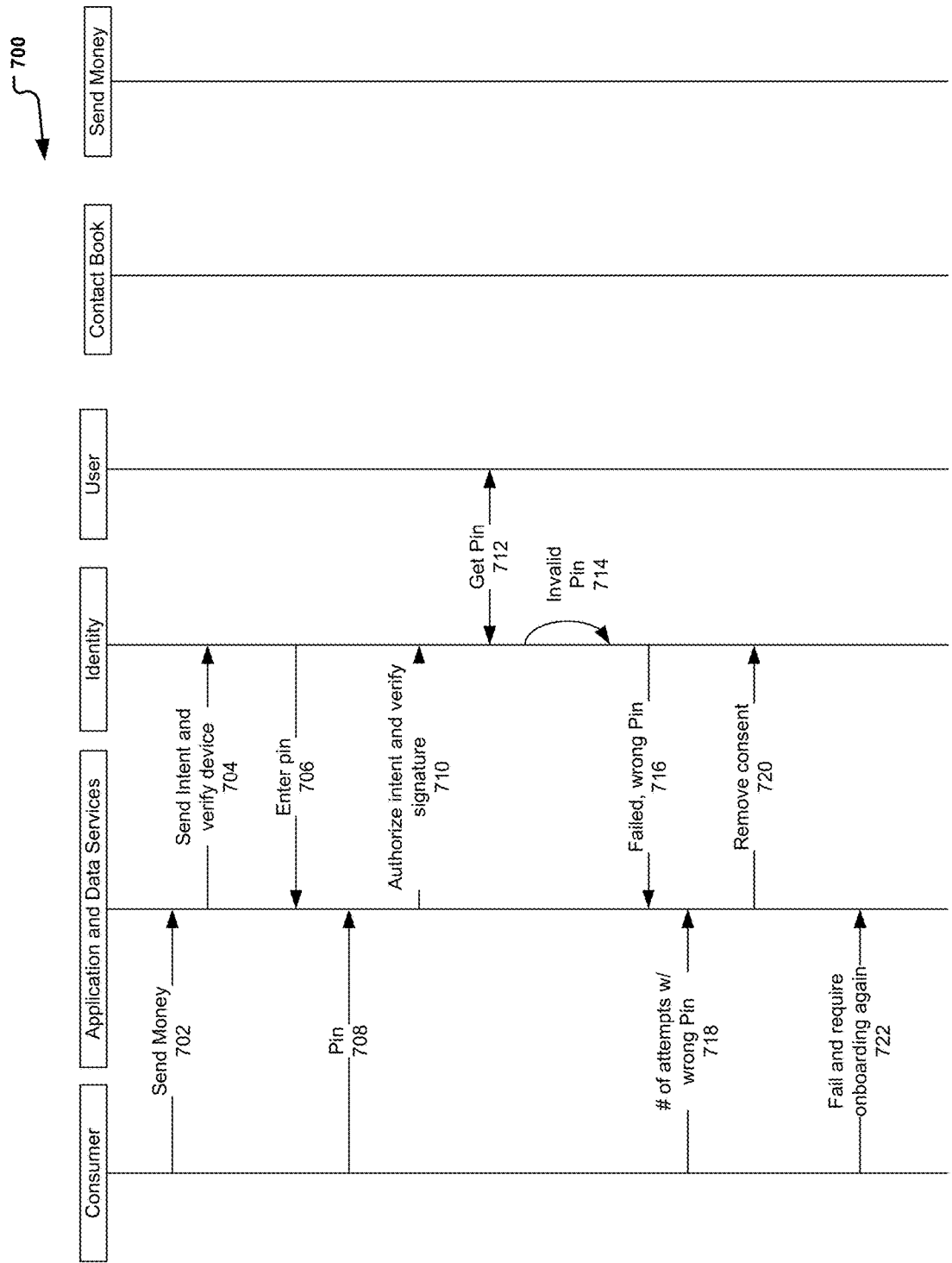
FIG. 7 illustrates a timing diagram of communication between the wireless personal assistant system and a service provider for performing a monetary transfer using an invalid personal identification number.

Turning now to FIGS. 6-7, other timing diagrams 600,700 are included to describe a send/request money flow and token upgrade flow for such requests. In particular, FIGS. 6-7 illustrate a send money flow with a valid and invalid PIN respectively. At FIGS. 6 and 7, the timing diagram begins with a user communication with the wireless personal assistant 106 via the application and data services. The communication consists of series of checks and verifications with an identity entity to ensure the communication between the wireless personal assistant 106 and a payment provider system or other financial institution can occur to enable the transfer of funds in this case. Such communication is illustrated in FIG. 6 with the send money flow 600, beginning with a request to send money 602 to the receipt and verification of PIN 612 from the user at a user device 104. From the request for a monetary transfer, application and data services may receive and request the verification of the device making the request 604. The verification can include the verification of a signature certificate, a device ID, security content, etc. In response, a request for a PIN may be sent 606 and received 608 and used for verification and correlation against a PIN requested and received from the user at user device 612. The verification and correlation can include a communication between identity, and the application and data services for correct token, certification, and authentication. Thus, once signatures, devices, and other security content is verified, the PIN may be vocalized and validated at FIG. 6 by 612. A valid PIN will include obtaining a hash-based message authentication code (hmac) from the user. Verification of the hmac pin will then enable the access of the contact book 614 (contacts API with the person) and send request 616. If the contact is found, the request is sent and a notification of a successful transfer is received at both the application and data services 620 and at the consumer device 622, where the request was made. If the contact is found on the contact list, then the recipient contact information and funding instrument information may be communicated for the completion of the transaction and payment. Alternatively, if the contact does not exist, the user may be asked to vocalize the recipient's name again and/or asked to import the contact information to the payment provider application. Additionally, if a funding request comes from an application where the contact exists which is not a user of the payment provider, then the information may be pulled or imported from a social application, user email account, or the like. Once the contact information is identified, the communication continues to the completion of the transaction and payment.

Turning next to FIG. 7, the send money flow 700 with an invalid PIN is illustrated. FIG. 7 timing diagram begins much like FIG. 6 send money flow 600 with the send money request 702 through verification of PIN 712 from the user at a user device 104. From the request for a monetary transfer, application and data services may receive and request the verification of the device making the request 704. The verification can include the verification of a signature certificate, a device ID, security content, etc. In response, a request for a PIN may be sent 706 and received 708 and used for verification and correlation against a PIN requested and received from the user at user device 712. The verification and correlation can include a communication between identity, and the application and data services for correct token, certification, and authentication. Thus, once signatures, devices, and other security content is verified, the PIN may be vocalized and validated at FIG. 7 by 712. If an invalid hmac pin 714 is retrieved, the money transfer request may not occur, be cancelled, and transaction failed. In some instances, the hmac pin is stored for a predetermined time and thus the script may be run periodically which deletes such hashed PIN. In particular once the PIN is received, a user is provided with a predetermined number of attempts/failed attempts, access to the contact book will not occur and a request will failure will be communicated.

Note that in addition to the timing diagrams discussed above and in conjunction with FIGS. 6 and 7, other communications may occur between the wireless personal assistant system, a service provider and/or a user device. For example, a communication may occur when a token upgrade is needed. Such upgrade may include a communication with identity, cryptography, and other similar modules, components, devices, or systems. In one embodiment, the token authentication can begin with the authentication of user context data and metadata which is authenticated between a security token service and 2-factor authentication entity. The security content may be checked against an hmac PIN and verification of it as the token may be upgraded. The process can include the communication of such pin and details with the cryptography services entities and concludes with full authentication at the application. Similarly other communications can also exist for onboarding, changing, or updating financial instruments, contacts, PIN, etc. Also, note that the timing diagram(s) is for illustrative purposes and other processes, communications, and entities may be contemplated.

Figure 8:
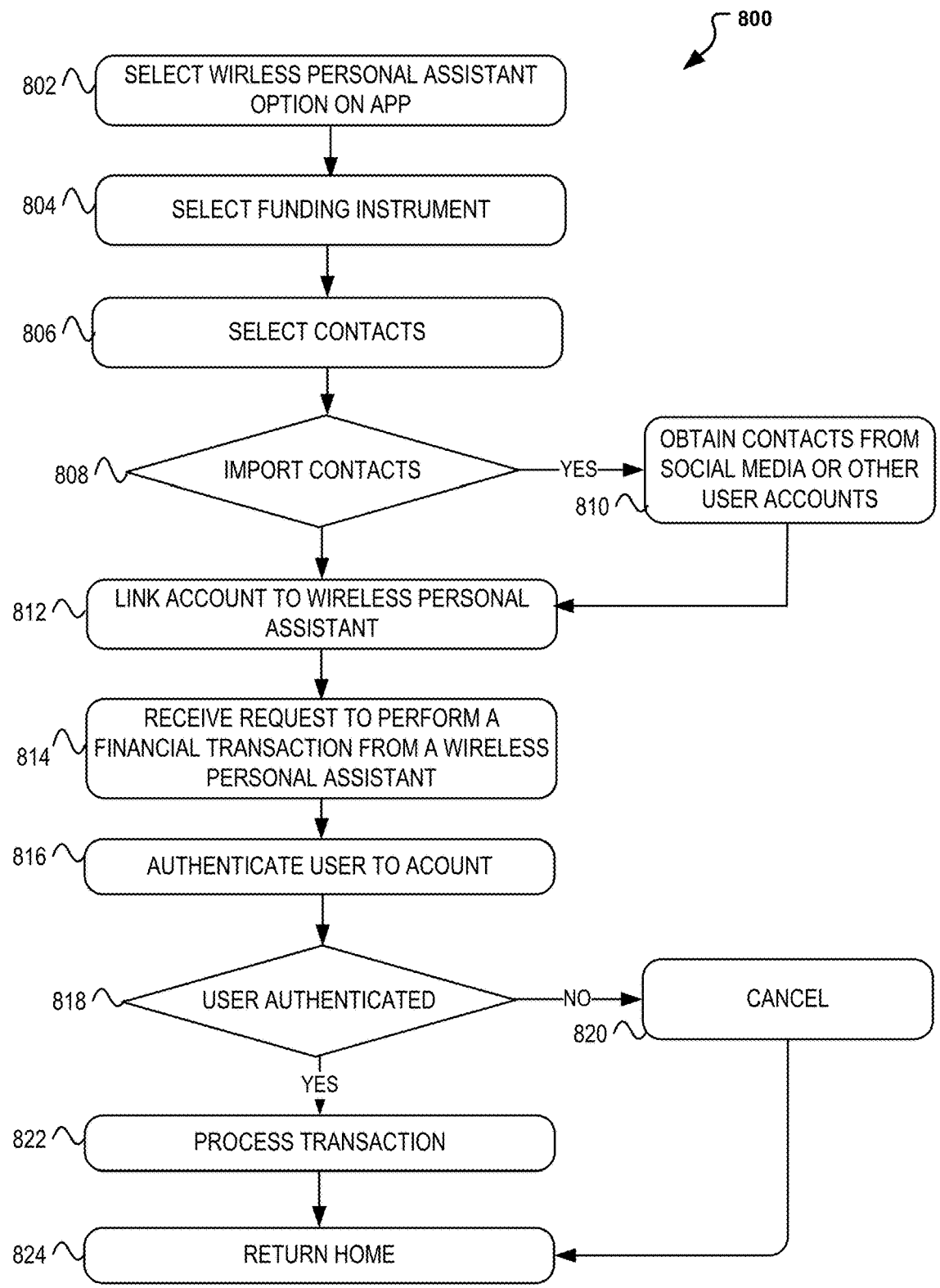
FIG. 8 illustrates a flow diagram of a method for performing a transaction using a wireless personal assistant system.

FIG. 8 illustrates an example process for completing a financial transaction using a wireless digital assistant. In particular, FIG. 8 includes a flow diagram illustrating operation for initiating and performing a financial transaction with the wireless digital assistant. According to some embodiments, process 800 may include one or more of operations 802-824, which may be implemented, at least in part, in the form of executable code stored on a non-transitory, tangible, machine readable media that, when run on one or more hardware processors, may cause a system to perform one or more of the operations 802-824.

Process 800 begins with operation 802, where a wireless personal assistant option is selected on an application of a user device. As indicated above and in conjunction with FIGS. 2-4, the wireless personal assistant option is available from the user device 104. Alternatively, the wireless personal assistant option may be available on a display of the wireless personal assistant 106. For example, the linking to the wireless personal assistant 106 option may be initiated when the user 108 is at the homepage of the application, after purchasing/connecting a wireless personal assistant system 106. To perform a financial transaction, the wireless personal assistant 106 should be linked to an account and onboarded. Operations 804-812 illustrate the setup process wherein a user 108 is selecting a primary funding instrument to use for the financial transactions performed with the wireless personal assistant 106. Operation 806 includes the selection of contact to include for use with the wireless personal assistant 106. For example, the contacts can be a close friend who frequently has lunch with you and with whom monetary funds may be exchanged. Alternatively, the contacts can be relatives, co-workers, or even acquaintances that may be involved in a fundraiser, collection, or donation. In some instances, the contacts may be located in the user device 104, however in other instances, the contacts may be imported from other locations. At operation 808, a decision is made as to whether the contacts to be used in connection with the wireless personal assistant need to be imported. If the contacts need to be imported, then process 800 continues to operation 810, where contacts are retrieved from a social media, email, or other user account. If however, no additional contacts are necessary, then process 800 continues to operation 812 where the user account associated with the payment provider or other financial institution for use in transacting is linked to the personal wireless assistant.

Upon linking the account and consenting to transacting using the wireless personal assistant system, financial transactions can be performed. At operation 814, a request is received to perform a financial transaction from the wireless personal assistant. In one embodiment, the transaction request can come in the form of a vocal command from the user to the user to the wireless personal assistant. The user command can include a request to one or more contacts for the transfer, request, etc. of a monetary amount. The request then gets processed and authenticated at operation 818. If user authentication fails at operation 818, the request is cancelled at operation 820 and the user is returned home, to a reset state, idle state or the like which limits the interaction with a user account until verification occurs. Alternatively, if the user is authentication, process 800 continues to operation 822 where the transaction is processed before returning to a home state at operation 824. Note that in some instances, process 800 may include more or less operations and FIG. 8 is provided for exemplary purposes.

Figure 9:
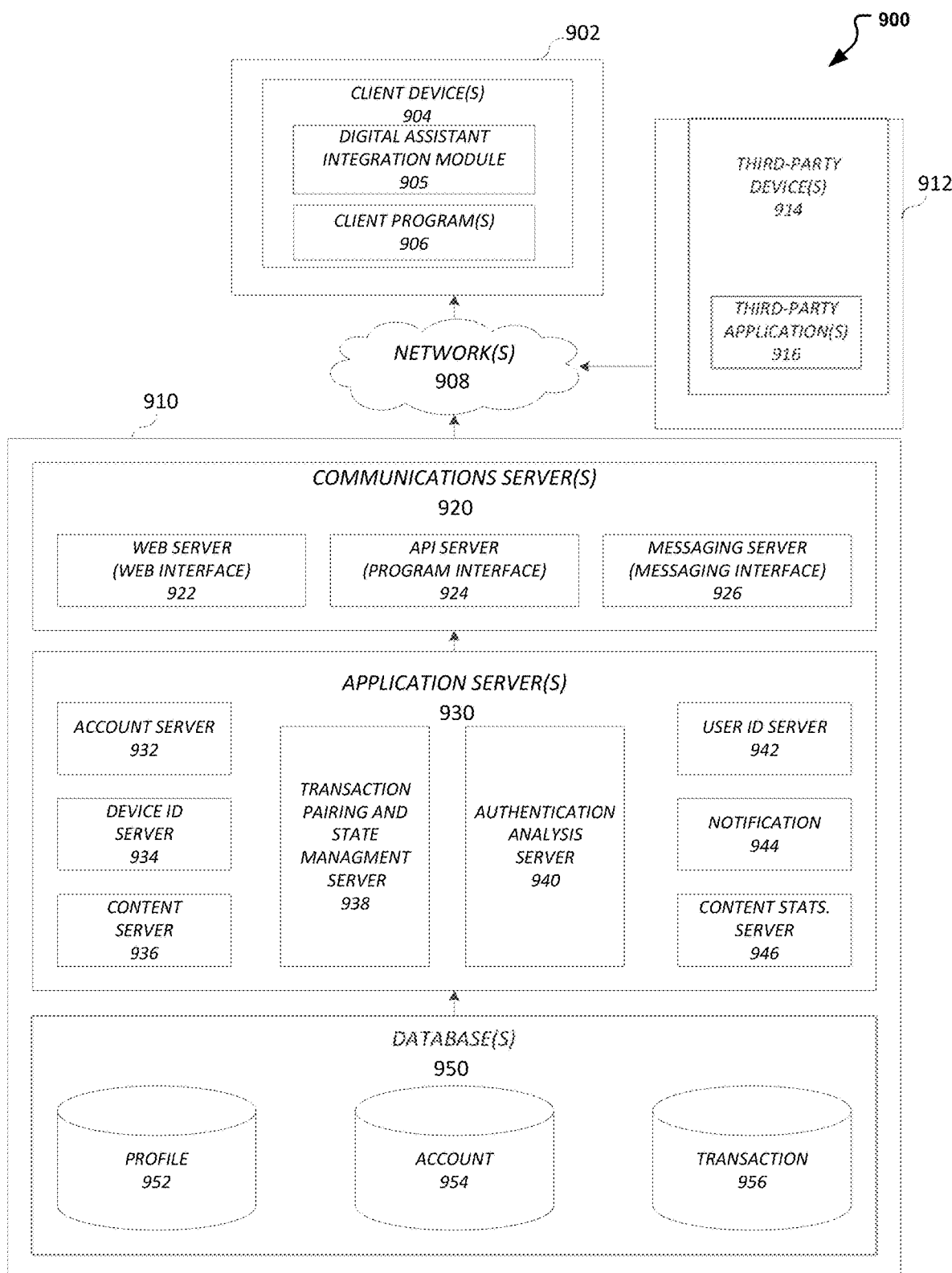
FIG. 9 illustrates a block diagram of a system for performing a transaction using a wireless personal assistant system.

FIG. 9 illustrates, in block diagram format, an example embodiment of a computing environment adapted for implementing a system for queue reduction. As shown, a computing environment 900 may comprise or implement a plurality of servers and/or software components that operate to perform various methodologies in accordance with the described embodiments. Severs may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 9 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing environment 900 may include, among various devices, servers, databases and other elements, one or more clients 902 that may comprise or employ one or more client devices 904, such as a laptop, a mobile computing device, a tablet, a PC, a wearable device, and/or any other computing device having computing and/or communications capabilities in accordance with the described embodiments. Client devices 904 may include a cellular telephone, smart phone, electronic wearable device (e.g., smart watch, virtual reality headset), wireless digital assistant, or other similar devices that a user may carry on or about his or her person and/or device the user can access readily.

Client devices 904 generally may provide one or more client programs 906, such as system programs and application programs to perform various computing and/or communications operations. Some example system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Some example application programs may include, without limitation, a web browser application, messaging applications (e.g., e-mail, IM, SMS, MMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 906 may display various graphical user interfaces (GUIs) to present information to and/or receive information from one or more users of client devices 1004. In some embodiments, client programs 906 may include one or more applications configured to conduct some or all of the functionalities and/or processes discussed below.

Client device 904 (e.g., device 104) may also include a digital assistant integration module 905, that can be used in network-based system 910 to determine if a financial transaction has been requested, to communicate with one or more devices for access and authorization of the withdrawal and at least for enabling the transaction.

As shown, client devices 904 may be communicatively coupled via one or more networks 908 to a network-based system 910. Network-based system 910 may be structured, arranged, and/or configured to allow client 902 to establish one or more communications sessions between network-based system 910 and various computing devices 904 and/or client programs 906. Accordingly, a communications session between client devices 904 and network-based system 910 may involve the unidirectional and/or bidirectional exchange of information and may occur over one or more types of networks 908 depending on the mode of communication. While the embodiment of FIG. 9 illustrates a computing environment 900 deployed in a client-server operating relationship, it is to be understood that other suitable operating environments, relationships, and/or architectures may be used in accordance with the described embodiments.

Data communications between client devices 904 and the network-based system 910 may be sent and received over one or more networks 1008 such as the Internet, a WAN, a WWAN, a WLAN, a mobile telephone network, a landline telephone network, personal area network, as well as other suitable networks. For example, client devices 904 may communicate with network-based system 910 over the Internet or other suitable WAN by sending and or receiving information via interaction with a web site, e-mail, IM session, and/or video messaging session. Any of a wide variety of suitable communication types between client devices 904 and system 910 may take place, as will be readily appreciated. In particular, wireless communications of any suitable form may take place between client device 904 and system 910, such as that which often occurs in the case of mobile phones or other personal and/or mobile devices.

In various embodiments, computing environment 900 may include, among other elements, a third party 912 (e.g., ATM, merchant POS systems, wireless personal assistant, etc.) which may comprise or employ third-party devices 914 hosting third-party applications 916. In various implementations, third-party devices 914 and/or third-party applications 916 may host applications associated with or employed by a third party 912. For example, third-party devices 914 and/or third-party applications 916 may enable network-based system 910 to provide client 902 and/or system 910 with additional services and/or information, such as merchant information, data communications, payment services, security functions, customer support, and/or other services, some of which will be discussed in greater detail below. Third-party devices 914 and/or third-party applications 916 may also provide system 910 and/or client 902 with other information and/or services, such as email services and/or information, property transfer and/or handling, purchase services and/or information, and/or other online services and/or information.

In one embodiment, third-party devices 914 may include one or more servers, such as a transaction server that manages and archives transactions. In some embodiments, the third-party devices may include a purchase database that can provide information regarding purchases of different items and/or products. In yet another embodiment, third-party severs 914 may include one or more servers for aggregating consumer data, tokens, authentication information, user profiles, and the like.

Network-based system 910 may comprise one or more communications servers 920 to provide suitable interfaces that enable communication using various modes of communication and/or via one or more networks 908. Communications servers 920 may include a web server 922, an API server 924, and/or a messaging server 926 to provide interfaces to one or more application servers 930. Application servers 930 of network-based system 910 may be structured, arranged, and/or configured to provide various online services, merchant identification services, merchant information services, purchasing services, monetary transfers, money withdrawals, money deposits, checkout processing, data gathering, data analysis, and other services to users that access network-based system 910. In various embodiments, client devices 904 and/or third-party devices 914 may communicate with application servers 930 of network-based system 910 via one or more of a web interface provided by web server 922, a programmatic interface provided by API server 924, and/or a messaging interface provided by messaging server 926. It may be appreciated that web server 922, API server 924, and messaging server 926 may be structured, arranged, and/or configured to communicate with various types of client devices 904, third-party devices 914, third-party applications 916, and/or client programs 906 and may interoperate with each other in some implementations.

Web server 922 may be arranged to communicate with web clients and/or applications such as a web browser, web browser toolbar, desktop widget, mobile widget, web-based application, web-based interpreter, virtual machine, mobile applications, and so forth. API server 924 may be arranged to communicate with various client programs 906 and/or a third-party application 916 comprising an implementation of API for network-based system 910. Messaging server 926 may be arranged to communicate with various messaging clients and/or applications such as e-mail, IM, SMS, MMS, telephone, VoIP, video messaging, IRC, and so forth, and messaging server 926 may provide a messaging interface to enable access by client 902 and/or third party 912 to the various services and functions provided by application servers 930.

Application servers 930 of network-based system 910 may be a server that provides various services to clients including, but not limited to, data analysis, geofence management, order processing, checkout processing, monetary transfers, location services, and/or the like. Application server 930 of network-based system 910 may provide services to third-party merchants such as real time consumer metric visualizations, real time purchase information, and/or the like. Application servers 930 may include an account server 932, device identification server 934, content server 936, transaction pairing and state management server 938, purchase, authentication analysis server 940, user identification server 942, notification server 944, and/or content statistics server 946. These servers, which may be in addition to other servers, may be structured and arranged to configure the system for monitoring queues and identifying ways for reducing queue times.

Application servers 930, in turn, may be coupled to and capable of accessing one or more databases 950 including a profile database 952, an account database 954, transaction database 956, and/or the like. Databases 950 generally may store and maintain various types of information for use by application servers 930 and may comprise or be implemented by various types of computer storage devices (e.g., servers, memory) and/or database structures (e.g., relational, object-oriented, hierarchical, dimensional, network) in accordance with the described embodiments.

Figure 10:
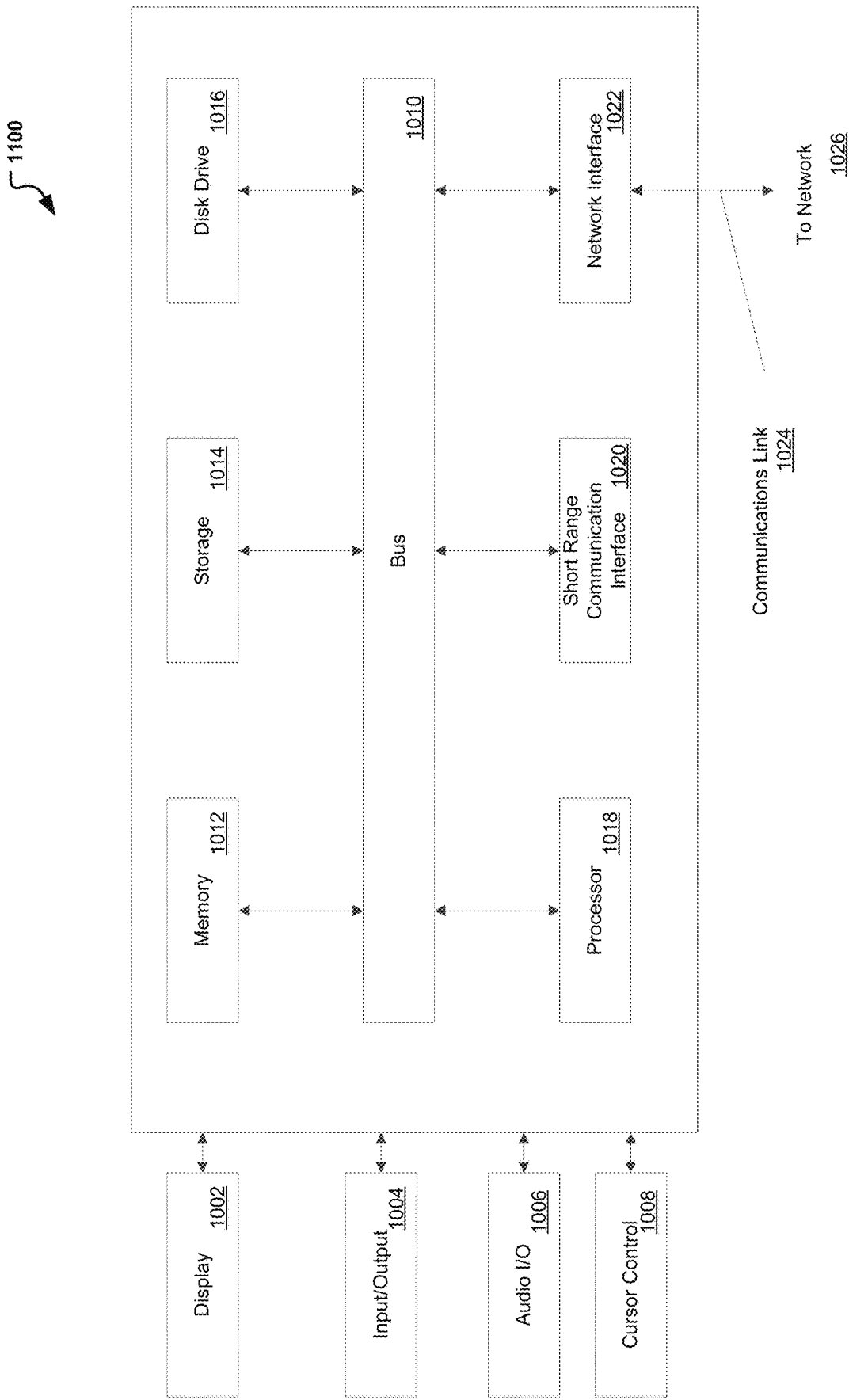
FIG. 10 illustrates an example block diagram of a computer system suitable for implementing one or more devices of the communication systems of FIGS. 1-9.

FIG. 10 illustrates an example computer system 1000 in block diagram format suitable for implementing on one or more devices of the system in FIGS. 1-9. In various implementations, a device that includes computer system 1000 may comprise a personal computing device (e.g., a smart or mobile device, a computing tablet, a personal computer, laptop, wearable device, PDA, wireless personal assistant, etc.) that is capable of communicating with a network 1026 (e.g., network 1008). A service provider and/or a content provider may utilize a network computing device (e.g., a network server) capable of communicating with the network. It should be appreciated that each of the devices utilized by users, service providers, and content providers may be implemented as computer system 1000 in a manner as follows.

Additionally, as more and more devices become communication capable, such as new smart devices using wireless communication to report, track, message, relay information and so forth, these devices may be part of computer system 1000. For example, windows, walls, and other objects may double as touch screen devices for users to interact with. Such devices may be incorporated with the systems discussed herein.

Computer system 1000 may include a bus 1010 or other communication mechanisms for communicating information data, signals, and information between various components of computer system 1000. Components include an input/output (I/O) component 1004 that processes a user action, such as selecting keys from a keypad/keyboard, selecting one or more buttons, links, actuatable elements, etc., and sending a corresponding signal to bus 1010. I/O component 1004 may also include an output component, such as a display 1002 and a cursor control 1008 (such as a keyboard, keypad, mouse, touchscreen, etc.). In some examples, I/O component 1004 other devices, such as another user device, a merchant server, an email server, application service provider, web server, a payment provider server, an ATM server, third party server, and/or other servers via a network. In various embodiments, such as for many cellular telephone and other mobile device embodiments, this transmission may be wireless, although other transmission mediums and methods may also be suitable. A processor 1018, which may be a micro-controller, digital signal processor (DSP), or other processing component, that processes these various signals, such as for display on computer system 1000 or transmission to other devices over a network 1026 via a communication link 1024. Again, communication link 1024 may be a wireless communication in some embodiments. Processor 1018 may also control transmission of information, such as cookies, IP addresses, images, and/or the like to other devices.

Components of computer system 1000 also include a system memory component 1014 (e.g., RAM), a static storage component 1014 (e.g., ROM), and/or a disk drive 1016. Computer system 1000 performs specific operations by processor 1018 and other components by executing one or more sequences of instructions contained in system memory component 1012 (e.g., for engagement level determination). Logic may be encoded in a computer readable medium, which may refer to any medium that participates in providing instructions to processor 1018 for execution. Such a medium may take many forms, including but not limited to, non-volatile media, volatile media, and/or transmission media. In various implementations, non-volatile media includes optical or magnetic disks, volatile media includes dynamic memory such as system memory component 1012, and transmission media includes coaxial cables, copper wire, and fiber optics, including wires that comprise bus 1010. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, hard disk, magnetic tape, any other magnetic medium, CD-ROM, any other optical medium, RAM, PROM, EPROM, FLASH-EPROM, any other memory chip or cartridge, or any other medium from which a computer is adapted to read.

Components of computer system 1000 may also include a short range communications interface 1020. Short range communications interface 1020, in various embodiments, may include transceiver circuitry, an antenna, and/or waveguide. Short range communications interface 1020 may use one or more short-range wireless communication technologies, protocols, and/or standards (e.g., WiFi, Bluetooth®, Bluetooth Low Energy (BLE), infrared, NFC, etc.).

Short range communications interface 1020, in various embodiments, may be configured to detect other devices (e.g., device 104, ATM 102, etc.) with short range communications technology near computer system 1000. Short range communications interface 1020 may create a communication area for detecting other devices with short range communication capabilities. When other devices with short range communications capabilities are placed in the communication area of short range communications interface 1020, short range communications interface 1020 may detect the other devices and exchange data with the other devices. Short range communications interface 1020 may receive identifier data packets from the other devices when in sufficiently close proximity. The identifier data packets may include one or more identifiers, which may be operating system registry entries, cookies associated with an application, identifiers associated with hardware of the other device, and/or various other appropriate identifiers.

In some embodiments, short range communications interface 1020 may identify a local area network using a short range communications protocol, such as WiFi, and join the local area network. In some examples, computer system 1000 may discover and/or communicate with other devices that are a part of the local area network using short range communications interface 1020. In some embodiments, short range communications interface 1020 may further exchange data and information with the other devices that are communicatively coupled with short range communications interface 1020.

In various embodiments of the present disclosure, execution of instruction sequences to practice the present disclosure may be performed by computer system 1000. In various other embodiments of the present disclosure, a plurality of computer systems 1000 coupled by communication link 1024 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link 1024 and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on the user and user device, however, a customer, a merchant, a service or payment provider may otherwise presented with tailored information. Thus, "user" as used herein can also include charities, individuals, and any other entity or person receiving information. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A wireless personal assistant system, comprising:
   a non-transitory memory storing instructions; and
   a processor coupled to the non-transitory memory and configured to execute the instructions to cause the wireless personal assistant system to:
   cause a mobile application that is executing on a user device of a user to display a graphical user interface via the user device;
   present, via the graphical user interface, 1) a prompt that allows a linking of a service provider account of the user with the wireless personal assistant system, and 2) a plurality of commands for conducting one or more transactions;
   based on user input received via the graphical user interface, link the service provider account of the user with the wireless personal assistant system, and select one or more commands of the plurality of commands as user-customized commands for conducting the one or more transactions;

receive, after the service provider account of the user has been linked with the wireless personal assistant system, a voice command from the user, wherein the voice command comprises a recipient name and a number;

determine that the voice command corresponds to at least one command of the selected one or more commands;

determine, in response to a determination that the voice command matches at least one command of the selected one or more commands, that the voice command corresponds to a request to perform a financial transaction involving the user;

retrieve user information associated with the user device, wherein the user information includes an authenticating personal identification number and contact list information, wherein the contact list information is imported from a user social media account associated with the user device;

authenticate, based on the authenticating personal identification number, the user;

determine, based on the number in the voice command, a monetary amount for the financial transaction;

determine, based on the recipient name in the voice command, a contact from the contact list information to which the monetary amount will be transferred for the financial transaction;

process the financial transaction for the monetary amount to be transferred from the service provider account of the user to the contact; and send, to the user device, a confirmation message associated with the financial transaction, wherein the confirmation message includes at least an image of the contact.

2. The system of claim 1, wherein a failed authentication results in a cancelation of the request.

3. The system of claim 2, wherein the failed authentication includes an incorrect personal identification number for a predetermined number of failed attempts to authenticate the user.

4. The system of claim 1, wherein the instructions further cause the wireless personal assistant system to send, to the user device, a notification of a successful transfer of monetary funds from the user to the contact.

5. A method, comprising:

accessing a graphical user interface of a mobile application running on a user device of a user;

causing the graphical user interface to present an option to link a service provider account of the user with a wireless personal assistant system executing on the user device;

linking, based on user input received via the graphical user interface, the service provider account of the user with the wireless personal assistant system;

causing the graphical user interface to present a plurality of commands for conducting one or more transactions;

selecting, based on further user input received via the graphical user interface, one or more commands of the plurality of commands as one or more user-customized voice commands for conducting the one or more transactions;

receiving, via the wireless personal assistant system, a voice command of the one or more user-customized voice commands from a user of the wireless personal assistant system, wherein the received voice command comprises a recipient name and a number amount;

determining, by the wireless personal assistant system, that the voice command corresponds to a request to perform a financial transaction;

retrieving, by the wireless personal assistant system, user information including an authenticating personal identification number and contact list information, wherein the contact list information is imported from a user social media account associated with the user;

authenticating the user by the wireless personal assistant system and based on the authenticating personal identification number;

determining, by the wireless personal assistant system and based on the number amount in the voice command, a monetary amount for the financial transaction;

determining, by the wireless personal assistant system and based on the recipient name in the voice command, a contact from the contact list information to which the monetary amount will be transferred for the financial transaction;

processing, via communications between the wireless personal assistant system and a service provider server over a wireless network connection, the financial transaction for the monetary amount to be transferred from the service provider account of the user to the contact; and sending, to the user device, a confirmation message associated with the financial transaction, wherein the confirmation message includes at least an image of the contact.

6. The method of claim 5, wherein a failed authentication results in a cancelation of the request.

7. The method of claim 6, wherein the failed authentication includes an incorrect personal identification number for a predetermined number of failed attempts to authenticate the user.

8. The method of claim 5, further comprising sending, from the wireless personal assistant system to the user device, a notification of a successful transfer of monetary funds from the user to the contact.

9. A non-transitory machine-readable medium having stored thereon machine-readable instructions executable to cause a wireless personal assistant system to perform operations comprising:

causing a mobile application of a user device of a user to display a graphical user interface, the graphical user interface presenting a prompt that allows a linking of a service provider account of the user with the wireless personal assistant system, the graphical user interface further presenting a plurality of voice commands for conducting one or more transactions;

linking, based on user input received via the graphical user interface, the service provider account of the user with the wireless personal assistant system;

selecting, based on further user input received via the graphical user interface, one or more of the plurality of voice commands as user-customized voice commands for conducting the one or more transactions, wherein a first voice command of the user-customized voice commands corresponds to a request to perform a financial transaction using the service provider account that has been linked with the wireless personal assistant system;

receiving a voice input from the user, wherein the voice input comprises a recipient name and a number;

determining that the voice input corresponds to the first voice command;

retrieving, based on the determining that the voice input corresponds to the first voice command, user information associated with the user device, the user information including an authenticating personal identification number and contact list information, wherein the contact list information is imported from a user social media account associated with the user device;

authenticating, based on the authenticating personal identification number, the user;

determining, based on the number in the first voice command, a monetary amount for the financial transaction;

determining, based on the recipient name in the voice command, a contact from the contact list information to which the monetary amount will be transferred for the financial transaction;

processing, via communications between the wireless personal assistant system and a service provider server over a wireless network connection, the financial transaction for the monetary amount to be transferred from the service provider account of the user to the contact; and sending, to the user device, a confirmation message associated with the financial transaction, wherein the confirmation message includes at least an image of the contact.

10. The non-transitory machine-readable medium of claim 9, wherein a failed authentication results in a cancelation of the request to perform the financial transaction.

11. The non-transitory machine-readable medium of claim 10, wherein the failed authentication includes an incorrect personal identification number for a predetermined number of failed attempts to authenticate the user.

12. The system of claim 1, wherein the personal identification number comprises a hash-based message authentication code.

13. The system of claim 1, wherein the instructions further cause the wireless personal assistant system to link the user device with the service provider account at least in part via a uniform resource identifier (URI).

14. The system of claim 1, wherein the confirmation message further includes a financial instrument used for the financial transaction and the monetary amount for the financial transaction.

15. The method of claim 5, wherein the processing the financial transaction for the monetary amount to be transferred from the user to the contact comprises communicating with a service provider server.

16. The method of claim 5, wherein the linking is performed at least in part via a uniform resource identifier (URI).

17. The method of claim 5, wherein the confirmation message further includes a financial instrument used for the financial transaction and the monetary amount for the financial transaction.

18. The non-transitory machine-readable medium of claim 9, wherein the processing the financial transaction for the monetary amount to be transferred from the user to the contact comprises communicating with a service provider server.

19. The non-transitory machine-readable medium of claim 9, wherein the linking is performed at least in part via a uniform resource identifier (URI).

20. The non-transitory machine-readable medium of claim 9, wherein the confirmation message further includes a financial instrument used for the financial transaction and the monetary amount for the financial transaction.

* * * * *